US011653650B2

(12) United States Patent
Abe et al.

(10) Patent No.: US 11,653,650 B2
(45) Date of Patent: May 23, 2023

(54) FUNGICIDE COMPOSITION AND METHOD FOR CONTROLLING DISEASE OF CROP

(71) Applicants: ISHIHARA SANGYO KAISHA, LTD., Osaka (JP); SUMITOMO CHEMICAL COMPANY, LIMITED, Tokyo (JP)

(72) Inventors: Yuzuka Abe, Osaka (JP); Shuko Nishimi, Osaka (JP)

(73) Assignees: ISHIHARA SANGYO KAISHA, LTD., Osaka (JP); SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/644,349

(22) PCT Filed: Aug. 31, 2018

(86) PCT No.: PCT/JP2018/032317
§ 371 (c)(1),
(2) Date: Mar. 4, 2020

(87) PCT Pub. No.: WO2019/049778
PCT Pub. Date: Mar. 14, 2019

(65) Prior Publication Data
US 2020/0383328 A1    Dec. 10, 2020

(30) Foreign Application Priority Data

Sep. 6, 2017   (JP) .............................. JP2017-170759

(51) Int. Cl.
*A01N 43/10* (2006.01)
*A01N 37/18* (2006.01)

(52) U.S. Cl.
CPC ............. *A01N 43/10* (2013.01); *A01N 37/18* (2013.01)

(58) Field of Classification Search
None
See application file for complete search history.

(56) References Cited

U.S. PATENT DOCUMENTS

| | | |
|---|---|---|
| 2010/0255116 A1 | 10/2010 | Mitani et al. |
| 2016/0081340 A1 | 3/2016 | Arimori et al. |
| 2016/0249617 A1 | 9/2016 | Dota |
| 2018/0271093 A1 | 9/2018 | Nishimura et al. |
| 2018/0297978 A1 | 10/2018 | Orimoto et al. |
| 2019/0053485 A1 | 2/2019 | Ogawa et al. |

FOREIGN PATENT DOCUMENTS

| | | |
|---|---|---|
| AR | 107129 A1 | 3/2018 |
| CN | 104798798 A | 7/2015 |
| CN | 108402043 A | 8/2018 |
| EP | 3 029 035 A1 | 6/2016 |
| EP | 3 162 208 A1 | 5/2017 |
| EP | 3 360 415 A1 | 8/2018 |
| JP | 2009-132681 A | 6/2009 |
| JP | 2015-131815 A | 7/2015 |
| JP | 2015131815 A * | 7/2015 |
| WO | WO 2009/080734 A2 | 5/2009 |
| WO | WO 2014/095994 A1 | 6/2014 |
| WO | WO 2014/192953 A1 | 12/2014 |
| WO | WO 2015/005355 A1 | 1/2015 |
| WO | WO 2015/049168 A1 | 4/2015 |
| WO | WO 2015/064727 A1 | 5/2015 |
| WO | WO 2015/141867 A1 | 9/2015 |
| WO | WO 2017/049141 A1 | 3/2017 |
| WO | WO 2017/061483 A1 | 4/2017 |
| WO | WO 2017/065228 A1 | 4/2017 |
| WO | WO 2017/110864 A1 | 6/2017 |
| WO | WO 2017/154905 A1 | 9/2017 |
| WO | WO 2018/083577 A1 | 5/2018 |
| WO | WO 2018/204435 A1 | 11/2018 |

OTHER PUBLICATIONS

McGrath, M. T. "What are fungicides" 2004, (https://www.apsnet.org/edcenter/disimpactmngmnt/topc/Pages/Fungicides.aspx) no pagination.*
Chilean Examination Report and Search Report, dated Jan. 13, 2021, for Chilean Application No. 202000552, with English translations.
International Search Report, dated Nov. 6, 2018, for International Application No. PCT/JP2018/032317, with an English translation.
Extended European Search Report for European Application No. 18854109.8, dated May 10, 2021.
European Office Action for European Application No. 18 854 109.8, dated Dec. 15, 2021.
Colombian Office Action and Search Report for Colombian Application No. 2020/0003865, dated May 10, 2022, with English translation.
Colombian Office Action and Search Report for corresponding Colombian Application No. 2020/0003865, dated Jan. 24, 2022, with English translation.
Brazilian Gazette for Brazilian Application No. BR112020004279-0, dated Dec. 20, 2022.
Brazilian Unfavorable Opinion for Brazilian Application No. BR112020004279-0, dated Dec. 12, 2022, with an English translation.

* cited by examiner

*Primary Examiner* — Erin E Hirt
(74) *Attorney, Agent, or Firm* — Birch, Stewart, Kolasch & Birch, LLP

(57) ABSTRACT

The present invention relates to a fungicide composition having excellent fungicidal activity, particularly a fungicide composition comprising isofetamid and mandestrobin as active ingredients, and a method for controlling a disease of a crop, which comprises applying isofetamid and mandestrobin to the crop.

7 Claims, No Drawings

FUNGICIDE COMPOSITION AND METHOD FOR CONTROLLING DISEASE OF CROP

TECHNICAL FIELD

The present invention relates to a fungicide composition and a method for controlling a disease of a crop.

BACKGROUND ART

N-[1,1-dimethyl-2-(4-isopropoxy-o-tolyl)-2-oxoethyl]-3-methylthiophene-2-carboxamide (hereinafter referred to as "isofetamid") is a compound known as an active ingredient of a plant disease controlling agent, i.e., an agricultural and horticultural fungicide, and has been described, for example, in The Pesticide Manual, BRITISH CROP PROTECTION COUNCIL, 17th edition, p. 654-655. In addition, (RS)-2-methoxy-N-methyl-2-[α-(2,5-xylyloxy)-o-tolyl]acetamide (hereinafter referred to as "mandestrobin") is also a compound known as an active ingredient of a controlling agent against plant diseases, i.e. an agricultural and horticultural fungicide and has been described, for example, in The Pesticide Manual, BRITISH CROP PROTECTION COUNCIL, 17th edition, p. 692.

Patent Document 1 describes that a fungicide composition having an excellent synergistic effect is obtained by mixing a carboxylic acid amide derivative including isofetamid, which is one of active ingredients in the fungicide composition of the present invention, or a salt thereof with other specific fungicide.

However, it has not been specifically known that the fungicide composition of the present invention exhibits a remarkably excellent fungicidal effect and has a higher controlling effect on a disease of a crop.

PRIOR ART DOCUMENTS

Patent Documents

Patent Document 1: WO2009/060734

SUMMARY OF THE INVENTION

Problems to be Solved by the Invention

During the cultivation of agricultural and horticultural crops, a wide variety of diseases may occur and more than one disease often occurs simultaneously. Controlling these diseases with only one kind of active ingredient may result in insufficient effect or increased risk of emergence of fungicide-resistance. Thus, it has been desired to find a mixture, which complements the disadvantages of conventional fungicides and has a stable controlling effect. The present invention relates to a fungicide composition suitable for agricultural and horticultural use and a method for controlling a disease of a crop.

Means for Solving the Problems

The inventors have studied to solve the above mentioned problems. As a result, they have found that a fungicide composition comprising isofetamid and mandestrobin as active ingredients has a wide fungicidal spectrum, exhibits stable fungicidal effects at low dosage, and further has a higher controlling effect on a disease of a crop by applying both chemicals even at low doses at which a practical effect is not exhibited by applying each chemical alone, and thus the present invention has been achieved.

That is, the present invention relates to a fungicide composition comprising isofetamid and mandestrobin as active ingredients and a method for controlling a disease of a crop, which comprises applying isofetamid and mandestrobin to a crop.

Effect of the Invention

The fungicide composition of the present invention has the wide fungicidal spectrum and safety to the crop, has a higher synergistic effect by mixing both fungicidal active ingredients in application of them at low dosage, at which a practical effect is not exhibited by applying each fungicidal active ingredient alone, and exhibits a practically higher controlling effect. The fungicide composition of the present invention also shows to be effective on a fungus resistant or low susceptible to existing fungicides.

EMBODIMENTS FOR CARRYING OUT THE INVENTION

The weight ratio between isofetamid and mandestrobin contained in the fungicide composition of the present invention is usually 1:1000 to 1000:1, preferably 1:100 to 100:1, more preferably 1:10 to 10:1, and even more preferably 1:2 to 2:1. Further, said weight between isofetamid and mandestrobin may be preferably 1:1000 to 1:10.

The fungicide composition of the present invention may be a mixture itself of isofetamid and mandestrobin or may be formulated in the form of oils, an emulsifiable concentrate, wettable powders, a water-dispersible granule, granules, powders, solutions, flowables, dry-flowables, microcapsules, oil-based dispersion, a water-based suspension concentrate, etc. by mixing the mixture with a solid or liquid carrier and, if necessary, adding a surfactant or other formulating adjuvant. Further, the fungicide composition of the present invention also includes a composition of isofetamid and mandestrobin together with surfactant or the like diluted in water so as to spray. The total amount of isofetamid and mandestrobin contained in the formulation is from 0.01 to 99% by weight, preferably from 0.1 to 90% by weight, and more preferably from 2 to 80% by weight, based on the total weight of the formulation.

Examples of the carrier include solid carriers such as clay, talc, bentonite, kaolin, diatomaceous earth, white carbon, calcium carbonate, sodium chloride, zeeklite, urea, ammonium sulfate, starch and the like, and liquid carriers such as aromatic hydrocarbons such as toluene, xylene and solvent naphtha, diethylene glycol monomethyl ether, dimethyl sulfoxide, dimethylformamide, vegetable oil such as corn oil, water and the like. Examples of the surfactant and dispersant include, for example, alkylsulfonic acid metal salts (hereinafter, the metal salts refer alkali metal salts and alkaline earth metal salts such as sodium salt, potassium salt, calcium salt and the like), alkylbenzene sulfonate, alkylnaphthalene sulfonate, alkylbenzenesulfonate condensed with formaldehyde, alkylnaphtalenesulfonate condensed with formaldehyde, lignin sulfonic acid metal salts, polycarboxylate metal salts, alkyl sulfosuccinate salts, diaryl alkyl disulfonic acid metal salts, alcohol sulfuric acid esters, alkyl aryl sulfonic acid metal salts, polyoxyethylene alkyl aryl ether sulfate, polyoxyethylene styryl phenyl ether sulfate, polyoxyethylene styryl phenyl ether phosphate, polyoxyethylene glycol ether, polyoxyethylene aryl phenyl ether, polyoxyethylene styryl phenyl ether, polyoxyethylene alkyl aryl ether, polyoxyethylene sorbitan monoalkylate, polyoxyethylene castor oil, polyoxyethylene hydrogenated castor oil and the like. The other adjuvants include binders such as carboxymethyl cellulose salts, polyvinyl alcohols, xanthan gum, dextrin, polyacrylic acid salts and the like, antifreezing agents such as ethylene glycol, polyethylene glycol, polypropylene glycol and the like, preservatives, and the like.

The preparation of the formulation can be carried out according to the usual method in this technical field.

In the method for controlling a disease of the present invention, the above described fungicide composition of the present invention may be used, or each of isofetamid and mandestrobin or the formulations of each of them may be sequentially applied without premixing them.

In the method for controlling a disease of the present invention, isofetamid and mandestrobin, the fungicide active ingredients, are usually applied to crops infected with or at risk of being infected with harmful pathogenic fungus at a weight ratio of 1:1000 to 1000:1, preferably 1:100 to 100:1, more preferably 1:10 to 10:1, and even more preferably 1:2 to 2:1. Further, said weight ratio between isofetamid and mandestrobin may be preferably 1:1000 to 1:10. The concentration and amount of them to be applied vary depending on the form of the formulation, the target disease, the occurrence tendency, the extent of the damage, the environmental condition, etc. However, in the case of the application as it is without dilution with water like powders, the amount of isofetamid to be applied per 10 ares is 0.01 g to 2.5 kg, and preferably 1 g to 500 g, and the amount of mandestrobin to be applied per 10 ares is 0.05 g to 2.5 kg, and preferably 5 g to 500 g. In the case of the application after diluting a formulation, such as wettable powders, a water-dispersible granule or a water-based suspension concentrate, in water, the concentration of isofetamid to be applied is 0.01 to 10000 ppm, preferably 0.1 to 10000 ppm, more preferably 1 to 10000 ppm, even more preferably 1 to 1000 ppm, even more preferably 50 to 200 ppm, even more preferably 0.01 to 10 ppm, and may be 0.01 to 1 ppm, and the concentration of mandestrobin to be applied is 0.01 to 10000 ppm, preferably 0.5 to 10000 ppm, more preferably 1 to 10000 ppm, even more preferably 1 to 1000 ppm, even more preferably 50 to 200 ppm and may be 0.01 to 10 ppm. The amount of isofetamid to be applied per 10 ares is generally 0.01 g to 2.5 kg, and preferably 1 g to 500 g, and the amount of mandestrobin to be applied per 10 ares is generally 0.05 g to 2.5 kg, and preferably 5 g to 500 g.

In the method for controlling a disease of the present invention, upon application of the fungicide composition of the present invention, the composition can be sprayed on the crop infected with or at risk of being infected with harmful pathogenic fungus, if necessary, using a sprayer such as a power sprayer, a shoulder sprayer, a handsprayer or the like. Also, upon application, the composition can be applied by mixing with other insecticides, fungicides, plant growth regulators, fertilizers and the like.

The fungicide composition of the present invention shows excellent fungicidal action by being applied to crops, for example vegetables such as cucumber, tomato, strawberry, eggplant, onion, leek, carrot, lettuce, cabbage, Chinese cabbage, pumpkin, melon and watermelon, fruit trees such as apple, pear, peach, cherry fruit, Japanese apricot, tangerine, grape and persimmon, beans such as soybean, kidney bean, pea and adzuki bean, and tea, etc., and is suitable for controlling, for example, powdery mildew, leaf mold, Cercospora leaf mold, gray mold, brown spot, scab (*Venturia inaequalis*), rust, Alternaria blotch, black spot, ring spot, fly speck, sooty blotch, fruit spot, anthracnose, purple blotch, leaf spot, sclerotinia rot, blossom blight, gummy stem blight, ripe rot, Anthracnose (Bird's eye rot), brown rot, phomopsis rot, brown stem rot, blister blight, net blister blight, gray blight, scab (*Elsinoë fawcettii*), valsa canker, shoot dieback, etc., and more suitable for controlling powdery mildew, leaf mold, anthracnose, scab (*Venturia inaequalis*), rust, Alternaria blotch, blossom blight, gray mold, valsa canker, brown spot, fly speck, sooty blotch, ripe rot, fruit spot, scab (*Elsinoë fawcettii*) and brown stem rot among the above diseases, and even more suitable for controlling scab (*Venturia inaequalis*) and anthracnose among the above diseases, and most suitable for controlling anthracnose among the above diseases. Further, the method for controlling a disease of the present invention is suitable for controlling these diseases.

Preferred embodiments of the present invention are described below.

[1] A fungicide composition comprising isofetamid and mandestrobin as active ingredients.

[2] The composition according to [1], wherein the weight ratio between isofetamid and mandestrobin is 1:1000 to 1000:1.

[3] The composition according to [1] or [2], wherein the weight ratio between isofetamid and mandestrobin is 1:100 to 100:1.

[4] The composition according to any one of [1] to [3], wherein the weight ratio between isofetamid and mandestrobin is 1:10 to 10:1.

[5] The composition according to [1] or [2], wherein the weight ratio between isofetamid and mandestrobin is 1:1000 to 1:10.

[6] The composition according to any one of [1] to [4], wherein the weight ratio between isofetamid and mandestrobin is 1:2 to 2:1.

[7] The composition according to any one of [1] to [6], for controlling scab of fruits or leafs.

[8] The composition according to any one of [1] to [6], for controlling anthracnose.

[9] A method for controlling a disease of a crop, which comprises applying isofetamid and mandestrobin to the crop.

[10] The method for controlling the disease of the crop according to [9], wherein the weight ratio between isofetamid and mandestrobin is 1:1000 to 1000:1.

[11] The method for controlling the disease of the crop according to [9] or [10], wherein the weight ratio between isofetamid and mandestrobin is 1:100 to 100:1.

[12] The method for controlling the disease of the crop according to any one of [9] to [11], wherein the weight ratio between isofetamid and mandestrobin is 1:10 to 10:1.

[13] The method for controlling the disease of the crop according to [9] or [10], wherein the weight ratio between isofetamid and mandestrobin is 1:1000 to 1:10.

[14] The method for controlling the disease of the crop according to any one of [9] to [12], wherein the weight ratio between isofetamid and mandestrobin is 1:2 to 2:1.

[15] The method according to any one of [9] to [14], wherein the concentration of isofetamid to be applied is 0.01 ppm to 10000 ppm and the concentration of mandestrobin to be applied is 0.01 ppm to 10000 ppm.

[16] The method according to any one of [9] to [15], wherein the concentration of isofetamid to be applied is 0.1 ppm to 10000 ppm and the concentration of mandestrobin to be applied is 0.5 ppm to 10000 ppm.

[17] The method according to any one of [9] to [16], wherein the concentration of isofetamid to be applied is 1 ppm to 10000 ppm and the concentration of mandestrobin to be applied is 1 ppm to 10000 ppm.

[18] The method according to any one of [9] to [17], wherein the concentration of isofetamid to be applied is 1 ppm to 1000 ppm, and the concentration of mandestrobin to be applied is 1 ppm to 1000 ppm.

[19] The method according to any one of [9] to [15], wherein the concentration of isofetamid to be applied is 0.01 ppm to 10 ppm and the concentration of mandestrobin to be applied is 0.01 ppm to 10 ppm.

[20] The method according to any one of [9] to [15], wherein the concentration of isofetamid to be applied is 0.01 ppm to 1 ppm, and the concentration of mandestrobin to be applied is 0.01 ppm to 10 ppm.

[21] The method according to any one of [9] to [18], wherein the concentration of isofetamid to be applied is 50 ppm to 200 ppm and the concentration of mandestrobin to be applied is 50 ppm to 200 ppm.

[22] The method according to any one of [9] to [21], which comprises controlling scab of fruits or leafs.

[23] The method according to any one of [9] to [21], which comprises controlling anthracnose.

EXAMPLES

Hereinafter, Test Examples relating to the present invention are described but are not intended to limit the present invention.

Test Example 1: Effect Test Against Pear Scab (Japanese Pear Scab) (Effect on Leaves)

A given amount of a chemical was sprayed on adult trees of pear (cultivar: Housui) with a pressurized sprayer in an amount sufficient to drip from the leaves. The spraying was performed four times in total at intervals of 8 to 10 days, about 50 leaves per area were investigated about the presence or absence of the onset of the disease days after the final spraying, and the ratio of the leaves with the onset of the disease and the disease control value were calculated (in triplicate). In addition, the theoretical value (of the disease control value) by mixing was also calculated according to the Colby's formula.

Disease control value=$(1-a/b) \times 100$ wherein a: Mean ratio of leaves with the onset of the disease in the treated area, b: Mean ratio of leaves with the onset of the disease in the untreated area;

Colby's formula=$(X+Y)-XY/100$ wherein

X: Disease control value when using isofetamid alone,

Y: Disease control value when using mandestrobin alone.

When the actually measured value is higher than the theoretical value, the fungicide composition of the present invention has a synergistic effect on pear scab (Japanese pear scab).

TABLE 1

| Treating chemical, concentration | Ratio of leaves with onset of disease (%) | Disease control value | Theoretical value |
|---|---|---|---|
| Isofetamid, 190 ppm | 40.5 | 56.4 | |
| Isofetamid, 90 ppm | 31.3 | 66.3 | |
| Mandestrobin, 140 ppm | 23.3 | 74.9 | |
| mandestrobin, 70 ppm | 31.7 | 65.9 | |
| Isofetamid + Mandestrobin, 190 ppm + 140 ppm | 3.3 | 96.4 | 89.0 |
| Isofetamid + Mandestrobin, 90 ppm + 70 ppm | 2.7 | 97.1 | 88.5 |
| No treatment area | 92.9 | | |

Test Example 2: Effect Test Against Pear Scab (Japanese Pear Scab) (Effect on Fruits)

A given amount of a chemical was sprayed on adult trees of pear (cultivar: Housui) with a pressurized sprayer in an amount sufficient to drip from the leaves and fruits. The spraying was performed four times in total at intervals of 6 to 11 days, about 50 fruits per area were investigated about the presence or absence of the onset of the disease 8 days after the final spraying, and the ratio of the fruits with the onset of the disease and the disease control value were calculated (in triplicate). In addition, the theoretical value (of the disease control value) by mixing was also calculated according to the Colby's formula.

Disease control value=$(1-a/b) \times 100$ wherein a: Mean ratio of fruits with the onset of the disease in the treated area, b: Mean ratio of fruits with the onset of the disease in the untreated area.

TABLE 2

| Treating chemical, concentration | Ratio of fruits with onset of disease (%) | Disease control value | Theoretical value |
|---|---|---|---|
| Isofetamid, 187 ppm | 17.2 | 62.3 | |
| Isofetamid, 134 ppm | 10.3 | 77.5 | |
| Isofetamid, 93 ppm | 7.6 | 83.4 | |
| Mmandestrobin, 140 ppm | 3.0 | 93.4 | |
| Mandestrobin, 100 ppm | 4.5 | 90.1 | |
| Mandestrobin, 70 ppm | 10.3 | 77.5 | |
| Isofetamid + Mandestrobin, 187 ppm + 140 ppm | 0 | 100 | 97.5 |
| Isofetamid + Mndestrobin, 134 ppm + 100 ppm | 0 | 100 | 97.8 |
| Isofetamid + Mandestrobin, 93 ppm + 70 ppm | 0 | 100 | 96.3 |
| No treatment area | 45.7 | | |

Test Example 3: Inhibitory Effect Test for Hyphal Elongation (Pear Scab (Japanese Pear Scab) Fungus, *Venturia nashicola*)

A fungal flora (diameter: 4 mm) obtained by pre-cultivation was transplanted on PDA (potato dextrose agar medium) containing a given concentration of a chemical and then cultured at room temperature of 20° C. for 25 days, followed by measuring the diameter (mm) of the grown flora to determine the hyphal elongation inhibition rate.

In addition, theoretical values (of the hyphal elongation inhibition rate) were calculated according to the Colby's calculation formula based on the above determined hyphal elongation inhibition rate, and presented in parenthesis in the table.

Inhibition rate=$(1-a/b) \times 100$ wherein a: "Mean diameter (mm) of flora in the treated area"—4,
b: "Mean diameter (mm) of flora in the untreated area"—4

Colby's formula=$(X+Y)-XY/100$

X: Inhibition rate when using isofetamid alone
Y: Inhibition rate when using mandestrobin alone.

When the experimental value is higher than the theoretical value, the fungicide composition of the present invention has a synergistic effect on pear scab (Japanese pear scab) fungus.

TABLE 3

| Isofetamid | Mandestrobin | | | | |
|---|---|---|---|---|---|
| | 10 ppm | 1 ppm | 0.1 ppm | 0.01 ppm | 0 ppm |
| 10 ppm | 100 (100) | 100 (100) | 100 (100) | 100 (100) | 100 |
| 1 ppm | 100 (72.1) | 81.6 (63.6) | 56.7 (56.1) | 56.0 (49.6) | 49.6 |
| 0.1 ppm | 80.9 (49.4) | 54.6 (33.8) | 31.2 (20.2) | 24.1 (8.5) | 8.5 |
| 0.01 ppm | 64.5 (44.7) | 34.0 (27.7) | 19.9 (12.8) | 7.8 (0.0) | 0.0 |
| 0 ppm | 44.7 | 27.7 | 12.8 | 0.0 | |

Numbers in the table: Inhibition rate (%), theoretical values in parentheses

Test Example 4: Inhibitory Effect Test for Hyphal Elongation (Apple Anthracnose (Apple Bitter Rot) Fungus, *Colletotrichum gloeosporioides*)

A fungal flora (diameter: 4 mm) obtained by pre-cultivation was transplanted on PDA containing a given concentration of a chemical and then cultured at room temperature of 20° C. for 2 days, followed by measuring the diameter of the grown flora in the same manner as described in Test Example 3 to determine the hyphal elongation inhibition rate.

In addition, theoretical values (of the hyphal elongation inhibition rate) were calculated according to the Colby's calculation formula based on the above determined hyphal elongation inhibition rate, and presented in parenthesis in the table.

TABLE 4

| Isofetamid | Mandestrobin | | | | |
|---|---|---|---|---|---|
| | 10 ppm | 1 ppm | 0.1 ppm | 0.01 ppm | 0 ppm |
| 10 ppm | 51.9 (35.0) | 49.4 (16.3) | 32.7 (6.3) | 38.5 (4.4) | 2.6 |
| 1 ppm | 48.7 (33.3) | 57.7 (14.1) | 31.4 (3.8) | 51.3 (1.9) | 0.0 |

TABLE 4-continued

| Isofetamid | Mandestrobin | | | | |
|---|---|---|---|---|---|
| | 10 ppm | 1 ppm | 0.1 ppm | 0.01 ppm | 0 ppm |
| 0.1 ppm | 62.2 (33.3) | 36.5 (14.1) | 20.5 (3.8) | 0.6 (1.9) | 0.0 |
| 0.01 ppm | 48.1 (33.3) | 52.6 (14.1) | 30.1 (3.8) | 0.0 (1.9) | 0.0 |
| 0 ppm | 33.3 | 14.1 | 3.8 | 1.9 | |

Numbers in the table: Inhibition rate (%), theoretical values in parentheses

Test Example 5: Inhibitory Effect Test for Hyphal Elongation (Apple Anthracnose (Apple Bitter Rot) Fungus, *Colletotrichum acutatum*)

A fungal flora (diameter: 4 mm) obtained by pre-cultivation was transplanted on PDA containing a given concentration of a chemical and then cultured at room temperature of 20° C. for 2 days, followed by measuring the diameter of the grown flora in the same manner as described in Test Example 3 to determine the hyphal elongation, inhibition rate.

In addition, theoretical values (of the hyphal elongation inhibition rate) were calculated according to the Colby's calculation formula based on the above determined hyphal elongation inhibition rate, and presented in parenthesis in the table.

TABLE 5

| Isofetamid | Mandestrobin | | | | |
|---|---|---|---|---|---|
| | 10 ppm | 1 ppm | 0.1 ppm | 0.01 ppm | 0 ppm |
| 10 ppm | 82.2 (66.5) | 71.3 (56.8) | 52.5 (24.8) | 45.5 (24.8) | 24.8 |
| 1 ppm | 82.2 (55.4) | 59.4 (42.6) | 38.6 (0.0) | 59.4 (0.0) | 0.0 |
| 0.1 ppm | 90.1 (56.8) | 54.5 (44.3) | 39.6 (3.0) | 11.9 (3.0) | 3.0 |
| 0.01 ppm | 86.1 (58.5) | 57.4 (46.6) | 37.6 (6.9) | 21.8 (6.9) | 6.9 |
| 0 ppm | 55.4 | 42.6 | 0.0 | 0.0 | |

Numbers in the table: Inhibition rate (%), theoretical values in parentheses

Now, Formulation Examples of the present invention will be described below.

However, the blend ratio, the type of formulation or the like in the present invention is by no means restricted to the following Examples.

Formulation Example 1

| | |
|---|---|
| (1) Isofetamid | 40 parts by weight |
| (2) Mandestrobin | 30 parts by weight |
| (3) Sodium alkylbenzene sulfonate | 14.5 parts by weight |
| (4) NaCl | 15 parts by weight |
| (5) Dextrin | 0.5 parts by weight |

The above components are added into a high-speed mixing granulator, mixed with an appropriate amount of water, granulated, and dried to obtain a water-dispersible granule.

Formulation Example 2

| (1) Kaolin | 78 parts by weight |
|---|---|
| (2) Sodium alkylnaphthalene sulfonate | 2 parts by weight |
| (3) Sodium polycarboxylate | 5 parts by weight |
| (4) Silica | 15 parts by weight |

The mixture of the above components and the mixture of Isofetamid and Mandestrobin at a ratio of 9:7 are mixed in a weight ratio of 9:1 to obtain a wettable powder.

Formulation Example 3

| (1) Clay | 33 parts by weight |
|---|---|
| (2) Sodium naphthalenesulfonate | 3 parts by weight |
| (3) Sodium lignosulfonate | 4 parts by weight |
| (4) Isofetamid | 30 parts by weight |
| (5) Mandestrobin | 30 parts by weight |

The above components are mixed to obtain a wettable powder.

Formulation Example 4

| (1) Isofetamid | 4.5 parts by weight |
|---|---|
| (2) Mandestrobin | 3.5 parts by weight |
| (3) Bentonite | 30 parts by weight |
| (4) Calcium carbonate | 57.5 parts by weight |
| (5) Sodium polyacrylate | 3 parts by weight |
| (6) Calcium lignosulfonate | 1.5 parts by weight |

The above components (1) and (2) are mixed and pulverized. The components (3) and (4) are mixed with the mixture, then components (5), (6) and an appropriate amount of water are mixed thereto. The mixture is extruded and granulated, followed by drying and sieving to obtain granules.

Formulation Example 5

| (1) Isofetamid | 20 parts by weight |
|---|---|
| (2) Mandestrobin | 15 parts by weight |
| (3) Clay | 55 parts by weight |
| (4) Alkyl sodium sulfosuccinate | 5 parts by weight |
| (5) Alkylnaphtalenesulfonate condensed with formaldehyde | 5 parts by weight |

The above components are mixed and pulverized. An appropriate amount of water is added to the mixture. The mixture is kneaded and then extruded and granulated, followed by drying and sieving to obtain a water-dispersible granule.

Formulation Example 6

| (1) Isofetamid | 9 parts by weight |
|---|---|
| (2) Mandestrobin | 7 parts by weight |
| (3) Polyoxyethylene tristyryl phenyl ether | 3 parts by weight |
| (4) Sodium polycarboxylate | 2 parts by weight |
| (5) Propylene glycol | 10 parts by weight |
| (6) Xanthangum | 0.2 parts by weight |
| (7) Preservative | 0.1 parts by weight |
| (8) Water | 68.7 parts by weight |

The above components (1) to (4) and (8) are mixed and pulverized by a wet-grinding machine. Then components (5) to (7) are mixed with the mixture to obtain a water-based suspension concentrate.

Formulation Example 7

| (1) Isofetamid | 20 parts by weight |
|---|---|
| (2) Mandestrobin | 15 parts by weight |
| (3) Polyoxyethylene tristyryl phenyl ether | 3 parts by weight |
| (4) Dibutyl block copolymer | 2 parts by weight |
| (5) Propylene glycol | 10 parts by weight |
| (6) Xanthangum | 0.1 parts by weight |
| (7) Preservative | 0.1 parts by weight |
| (8) Water | 49.8 parts by weight |

The above components (1) to (4) and (8) are mixed and pulverized by a wet-grinding machine. Then components (5) to (7) are mixed with the mixture to obtain a water-based suspension concentrate.

Formulation Example 8

| (1) Isofetamid | 20 parts by weight |
|---|---|
| (2) Mandestrobin | 20 parts by weight |
| (3) Polyoxyethylene tristyryl phenyl ether | 3 parts by weight |
| (4) Alkylnaphtalenesulfonate condensed with formaldehyde | 2 parts by weight |
| (5) Propylene glycol | 10 parts by weight |
| (6) Xanthangum | 0.1 parts by weight |
| (7) Preservative | 0.1 parts by weight |
| (8) Water | 44.8 parts by weight |

The above components (1) to (4) and (8) are mixed and pulverized by a wet-grinding machine. Then components (5) to (7) are mixed with the mixture to obtain a water-based suspension concentrate.

Formulation Example 9

| (1) Isofetamid | 30 parts by weight |
|---|---|
| (2) Mandestrobin | 20 parts by weight |
| (3) Polyoxyethylene tristyryl phenyl ether | 3 parts by weight |
| (4) Alkyl sodium sulfosuccinate | 2 parts by weight |
| (5) Propylene glycol | 10 parts by weight |
| (6) Xanthangum | 0.1 parts by weight |
| (7) Preservative | 0.1 parts by weight |
| (8) Water | 34.8 parts by weight |

The above components (1) to (4) and (8) are mixed and pulverized by a wet-grinding machine. Then components (5) to (7) are mixed with the mixture to obtain a water-based suspension concentrate.

Formulation Example 10

| | |
|---|---|
| (1) Isofetamid | 30 parts by weight |
| (2) Mandestrobin | 20 parts by weight |
| (3) Polyoxyethylene tristyryl phenyl ether sulfate | 3 parts by weight |
| (4) Alkyl sodium sulfosuccinate | 2 parts by weight |
| (5) Propylene glycol | 10 parts by weight |
| (6) Xanthangum | 0.1 parts by weight |
| (7) Preservative | 0.1 parts by weight |
| (8) Water | 34.8 parts by weight |

The above components (1) to (4) and (8) are mixed and pulverized by a wet-grinding machine. Then components (5) to (7) are mixed with the mixture to obtain a water-based suspension concentrate.

Formulation Example 11

| | |
|---|---|
| (1) Isofetamid | 10 parts by weight |
| (2) Mandestrobin | 10 parts by weight |
| (3) Polyoxyethylene hydrogenated castor oil | 12 parts by weight |
| (4) Bentonite | 1 parts by weight |
| (5) Corn oil | 67 parts by weight |

The above components are mixed and pulverized by a wet-grinding machine to obtain an oil-based dispersion.

Formulation Example 12

| | |
|---|---|
| (1) Isofetamid | 9 parts by weight |
| (2) Mandestrobin | 7 parts by weight |
| (3) Polyoxyethylene arylphenyl ether | 10 parts by weight |
| (4) Aromatic hydrocarbons | 74 parts by weight |

The above components are mixed to obtain an emulsifiable concentrate.

The invention claimed is:

1. A fungicide composition consisting of (a) isofetamid and mandestrobin as active ingredients and (b) a solid or liquid carrier, a surfactant, or other formulating adjuvant, wherein the weight ratio of isofetamid to mandestrobin is 1:1000 to 1000:1.

2. A method for controlling a disease of a crop, which consists of applying a fungicidal composition consisting of isofetamid and mandestrobin as active ingredients to the crop,
wherein the fungicidal composition consists of (a) isofetamid and mandestrobin as active ingredients and (b) a solid or liquid carrier, a surfactant, or other formulating adjuvant, and
wherein the disease is caused by harmful pathogenic fungus, and
wherein the weight ratio of isofetamid to mandestrobin is 1:1000 to 1000:1.

3. The method according to claim 2, wherein the concentration of isofetamid to be applied is 0.01 ppm to 10000 ppm and the concentration of mandestrobin to be applied is 0.01 ppm to 10000 ppm.

4. A method for controlling a disease of a crop, which consists of applying a fungicidal composition consisting of a synergistic disease controlling amount of isofetamid and mandestrobin as active ingredients to the crop;
wherein the fungicidal composition consists of (a) isofetamid and mandestrobin as active ingredients and (b) a solid or liquid carrier, a surfactant, or other formulating adjuvant, and
wherein the disease is caused by a harmful pathogenic fungus,
wherein the weight ratio of isofetamid to mandestrobin is 1:1000 to 1000:1, and
wherein the concentration of isofetamid to be applied is 0.01 ppm to 10000 ppm, and
wherein the concentration of mandestrobin to be applied is 0.01 ppm to 10000 ppm.

5. The method according to claim 4, wherein the weight ratio of isofetamid to mandestrobin is 1:10 to 10:1.

6. The method according to claim 2, wherein the harmful pathogenic fungus is selected from the group consisting of *Venturia nashicola*, *Colletotrichum gloeosporioides* and *Colletotrichum acutatum*.

7. The method according to claim 4, wherein the harmful pathogenic fungus is selected from the group consisting of *Venturia nashicola*, *Colletotrichum gloeosporioides* and *Colletotrichum acutatum*.

* * * * *